United States Patent Office 3,397,984
Patented Aug. 20, 1968

3,397,984
SILVER DYE BLEACH MATERIALS IMPROVING
IMAGE DENSITY
Carl J. Williams, Jr., Rochester, N.Y., assignor to Eastman Kodak Company, Rochester, N.Y., a corporation of New Jersey
No Drawing. Filed Aug. 19, 1965, Ser. No. 481,081
9 Claims. (Cl. 96—73)

ABSTRACT OF THE DISCLOSURE

This invention relates to photographic silver-dye-bleach materials having a bleachable dye and a lactone in the emulsion for the purpose of increasing the dye density.

---

This invention relates to photographic elements, and more particularly to photographic silver-dye-bleach materials.

One common form of the silver-dye-bleach process employs a multilayer coating containing red, green, and blue-sensitized silver-halide emulsion layers with bleachable cyan, magenta, and yellow dyes in or contiguous to the respective layers. After exposure to a light image, the material is developed in a black-and-white silver-halide developing solution and then treated with a bleaching solution containing a bleach catalyst which oxidizes the metallic image silver and is itself reduced. The reduced catalyst reacts with the associated dye reducing it to a colorless form, thus leaving a positive reversal dye image.

One problem with prior art silver-dye-bleach elements is that they have not had satisfactorily high maximum density in the reversal dye image. It therefore appears highly desirable to provide an improvement in silver-dye-bleach materials whereby reversal dye images of good maximum density are obtained.

One object of this invention is to provide novel photographic silver-dye-bleach materials. Another object of this invention is to provide novel photographic silver-dye-bleach elements which exhibit good maximum density in the reversal dye image. A further object of this invention is to provide novel photographic silver-dye-bleach elements featuring in the silver halide layers addenda which function to increase the maximum density of the reversal dye image. These and other objects of the invention will be apparent from the disclosure herein and in the appended claims.

In accordance with this invention, photographic silver-dye-bleach materials are provided which comprises at least one silver halide emulsion layer coated on a support, which emulsion contains in association therewith a bleachable dye and an agent which increases the maximum density of the reversal dye image, said agent having one of the following general formulas:

I.
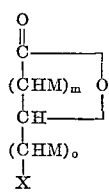

and

II.

wherein: M and Z are each hydroxy radicals or acyloxy radicals

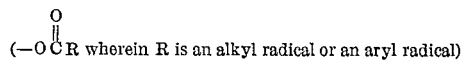

(—OCR wherein R is an alkyl radical or an aryl radical)

X is a hydrogen atom, an acyloxymethyl radical

(—CH₂OCR² wherein R² is an alkyl radical or an aryl radical)
or a carbinol radical (—CH₂OH); Y is a carboxy radical

(—COH)

a carbamyl radical

(—CNH₂)

or a radical having the formula $$-\overset{O}{\underset{\|}{C}}OR^1$$

wherein $R^1$ is an alkyl radical (more generally having 1 to 2 carbons, particularly when Z is a hydroxyl radical); A is a carbinol radical, a radical having the formula

as described for Y, a carboxy radical, an acyloxymethyl radical or a carbamyl radical; $m$ is an integer of 2 to 3; $n$ is an integer of 1 to 5; and $o$ is an integer of 0 to 2. The subject addenda contain at least one carbamyl or ester moiety including γ or α lactone or inner ester groups (e.g., Formula I) as well as the more conventional ester groups described above

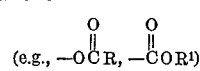

Hence, at least one of A, Y and Z of Formula II forms a carbamyl or an ester radical. Typical useful agents which function to increase maximum density in the reversal dye images can be represented by the following more subgeneric formulas:

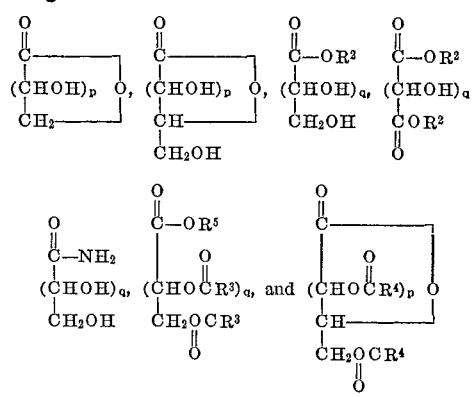

wherein: $R^2$ is an alkyl radical having 1 to 2 carbon atoms; $R^3$ and $R^4$ are each an alkyl radical which more generally has 1 to 8 carbon atoms or a phenyl radical, including substituted phenyl radicals; $R^5$ is an alkyl radical which more generally has 1 to 8 carbon atoms or a hydrogen atom; $p$ is an integer of 2 to 3; and $q$ is an integer of 1 to 5. Other subgeneric formulas defining dye density increasing addenda of the invention included within generic Formulas I and II can be formulated. The alkyl substituents described above suitably have 1 to 20 carbon atoms, and preferably 1 to 8 carbon atoms, including methyl, ethyl, isopropyl, butyl, heptyl, octyl, decyl, octadecyl, eicosyl and the like. The aryl substituents described above include such radicals as phenyl, tolyl, naphthyl and the like, phenyl being preferred.

As described above, a wide variety of amide or ester-hydroxy carboxylic acid derivatives can be utilized as agents which function to increase maximum density in the reversal dye images for photographic silver halide emulsions. Such compounds can be prepared by conventional amidation and esterification techniques with such saturated, aldehyde radical-free, hydroxy carboxylic acids as glyceric, erythronic, arabonic, lyxonic, ribonic, xylonic, gluconic, galactonic, mannoic, gulonic, tartaric, glucoguloheptonic and the like hydroxy carboxylic acids.

Literature references describing the preparation of typical dye density increasing addenda of the invention include:

(a) J. Am. Chem. Soc., 37, 345 (1915)
(b) J. Am. Chem. Soc., 55, 2512 (1933)
(c) J. Am. Chem. Soc., 62, 1074 (1940)
(d) J. Am. Chem. Soc., 69, 915 (1947)
(e) J. Org. Chem. 18, 952 (1953)
(f) J. Am. Chem. Soc., 78, 2825 (1956)
(g) Helv. Chim. Acta, 34, 2343
(h) J. Am. Pharm. Assoc., 28, 364 (1949)
(i) U.S. Patent 2,380,444

Other references can be found in the literature describing the preparation of the present feature addenda.

It has been found that the incorporation of the addenda of this invention in the silver halide emulsions in photographic silver-dye-bleach materials effectively results in substantial increases in the maximum density of the reversal dye image. Particularly useful results are obtained when the agents employed in this invention are incorporated in a silver halide emulsion layer having in association therewith a bleachable cyan dye; however, the addenda employed herein are broadly useful in any of the commonly employed emulsion layers used in dye bleach materials, such as blue sensitive emulsion layers having in association therewith bleachable yellow dye and green sensitive emulsion layers having in association therewith bleachable magenta dye. As employed herein, silver halide emulsions having bleachable dyes "in association therewith" refers to elements wherein the dye is incorporated in the emulsion layer or in a layer contiguous to the emulsion layer. Particularly useful results are realized when photographic elements are provided suitable for recording multicolor images, such as elements wherein separate, overlying layers are coated on a support, one emulsion layer being sensitive to red radiation and containing a bleachable cyan dye, a separate green sensitive layer containing a bleachable magenta dye and a separate blue sensitive emulsion layer containing a bleachable yellow dye, each of said emulsion layers having incorporated therein the novel dye-density-increasing addenda of the invention. It will be noted that in such elements, the bleachable dyes may be in a layer contiguous to the emulsion layers, as is known in the art.

The most effective concentration of addenda is advantageously from about 5 to 100 grams of addenda per mole of silver halide, especially useful results being obtained with concentrations of from about 10 to 50 grams of addenda per mole of silver halide. The useful, effective concentration of addenda may, of course, be varied over considerable ranges to achieve the results desired. Generally speaking, increases in concentration of addenda results in corresponding increases in maximum density of the dye image. In multilayer dye bleach elements, for example wherein the red sensitive layer is coated adjacent to the support, a green sensitive layer is coated thereover and the outermost light sensitive layer is a blue sensitive layer, it may be desirable to vary the concentration of addenda in each layer to achieve proper color balance of dye densities in the various layers. Normally, in such elements somewhat higher concentrations are desirable in the lower light sensitive layer, in this instance the red sensitive layer. It appears that lower concentrations may be tolerated in the outermost light sensitive layer to achieve desired image density.

The dye-density-increasing action of the addenda used in our invention may be related in some manner to the ability of said addenda to reduce the amount of silver fog formed during development. However, other compounds commonly used to reduce the amount of silver fog formed during development, such as 5-mercapto-1-phenyltetrazole and 5-methylbenzotriazole, as well as compounds closely related to those used in my invention, such as D-glucose, are not effective dye-density increasing agents in the silver-dye-bleach process. Accordingly, it was unexpected that increases in dye density with little loss in speed could be obtained with the compounds employed in this invention.

This invention will be further illustrated by the following examples.

EXAMPLE 1

A photographic element is prepared by coating a transparent cellulose triacetate support with a silver bromoiodide emulsion containing a bleachable cyan dye having the following formula:

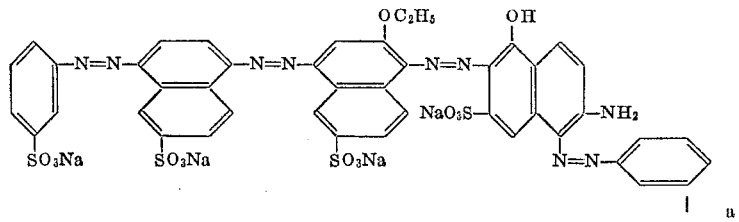

a mordant of the type described in Minsk U.S. Patent 2,882,156, and a quinoxaline dye bleach catalyst, all dispersed in gelatin. The structure and composition of the photographic element is shown below:

Layer A—100 mg. per square foot gelatin
Layer B—Red sensitive silver bromoiodide emulsion coated at 250 mg. per square foot silver and 400 mg. per square foot gelatin; 56 mg. per square foot cyan dye; 190 mg. per square foot mordant; 40 mg. per square foot 6,7-dimethyl-2,3-dipyridylquinoxaline
Cellulose triacetate support.

Two samples of the above coating are prepared: Sample 1 having 60 mg. per square foot of methyl arabonate (from 20 percent aqueous solution) added to the emulsion layer, and sample 2, with no methyl arabonate added, serving as a control. These coatings are exposed and developed for 3 minutes in Kodak D-72 Developer to which is added 2 grams of potassium thiocyanate, and 0.05 gram of 5-methylbenzotriazole per liter, followed by fixation for 2 minutes in Kodak F-5 Fixer. Dye bleaching is accomplished by immersion for 30 seconds in 1 liter of a solution containing 125 grams of thiourea, 100 cc. of concentrated hydrochloric acid, 0.15 gram of 2-hydroxy-3-aminophenazine followed by a 3 minute ferricyanide bleach and fixation for 1 minute to remove excess silver.

The minus blue characteristics of the silver (in the black and white developer) and the reversal curves thus obtained are as follows:

| Sample | Black and White Developer Silver Image (mg./sq. ft.) | | | Reversal | | |
|---|---|---|---|---|---|---|
| | Max. | Fog | Relative Speed | $D_{max}$ | $D_{min}$ | Relative Speed |
| 1 | 237 | 20 | 107 | 1.20 | 0.04 | 159 |
| 2 (control) | 236 | 31 | 100 | 0.90 | 0.04 | 100 |

These results show that an increase of over 30 percent is obtained in the maximum density of the reversal dye image when the addendum of the invention is incorporated in silver-dye-bleach photographic elements. Similar increases in maximum dye density (about 30 percent increases) are obtained when the following compounds, typical of those coming within the scope of the invention, are substituted for methyl arabonate: ethyl D-arabonate, methyl D-arabonate tetraacetate, D-arabonamide, D-arabono-γ-lactone, isopropyl D-arabonate tetraacetate, 2,3,4,6-tetraacetyl-D-gluconic acid monohydrate, D-galactono-γ-lactone, D-galactonamide, methyl D-galactonate, ethyl D-mannonate, D-mannonamide, L-erythrono-γ-lactone, D-ribono-γ-lactone, D-ribonic acid tetraacetate, D-lyxono-γ-lactone and D-lyxonamide. In like manner, comparable results are obtained when typical compounds of the invention, as illustrated above, are incorporated in either a blue sensitive layer containing bleachable yellow dye or a green sensitive layer containing bleachable magenta dye.

EXAMPLE 2

The advantageous properties of the compounds of the invention are exemplified further in a multilayer silver-dye-bleach photographic element having the following layer arrangement:

Layer A—Gelatin overcoat
Layer B—Blue sensitive silver halide emulsion layer containing a bleachable yellow colored azo dye
Layer C—Yellow filter layer
Layer D—Green sensitive silver halide emulsion layer containing a bleachable magenta colored azo dye
Layer E—Red sensitive layer containing a bleachable cyan colored azo dye
Support.

Layers B, D, and E each contain 60 mg. per square foot of methyl D-arabonate. The coating is exposed and processed as in Example 1. Comparison with a control coating shows that the addition of methyl arabonate results in increases of approximately 30 percent in the maximum density of the reversal dye image in each layer. Similar increases in maximum dye density (about 30 percent increases) are obtained when the following compounds, typical of those coming within the scope of the invention, are substituted for methyl arabonate: ethyl D-arabonate, methyl D-arabonate tetraacetate, D-arabonamide, D-arabono-γ-lactone, isopropyl D-arabonate, tetraacetate, 2,3,4,6-tetraacetyl-D-gluconic acid monohydrate, D-galactono-γ-lactone, D-galactonamide, methyl D-galactonate, ethyl D-mannonate, D-mannonamide, L-erythrono-γ-lactone, D-ribono-γ-lactone, D-ribonic acid tetraacetate, D-lyxono-γ-lactone and D-lyxonamide.

EXAMPLE 3

For purposes of comparison, several compounds closely related to the useful addenda of the invention are incorporated in the silver-dye-bleach element described in Example 1. These compounds are ethylene bis(D-arabonate) tetraacetate, D-glucose and sucrose, each of which is incorporated in separate samples at 60 mg. per square foot. After exposure and processing as described in Example 1, it is found that each of these related compounds fails to increase the maximum density of the reversal dye image.

The addenda of the invention can be added to photographic emulsions using any of the well-known techniques in emulsion making. For example, they can be dissolved in a suitable solvent and added to the silver halide emulsion. The solvent should be selected so that it has no harmful effect upon the emulsion in accordance with usual practice, and generally solvents or diluents which are miscible with water are to be preferred.

In addition to the subject addenda, which increase dye density, the photographic emulsion of the invention can contain the usual well-known emulsion addenda such as spectral sensitizers, speed increasing materials (e.g., polyalkylene glycols, cationic compounds, thioethers, etc.), coating aids, gelatin hardeners, plasticizers and the like.

The dye-density-increasing agents of the invention can be used in various kinds of photographic emulsions. They can be used with silver halide emulsions chemically sensitized with compounds of the sulfur group, with noble metal salts such as gold salts, reducing agents or combinations of these. They can be added to the emulsion before or after addition of any spectral sensitizing dyes. Various silver salts can be used as the sensitive salt such as silver bromide, silver iodide, silver chloride, or mixed silver halides such as silver chlorobromide or silver bromoiodide.

In the preparation of the silver halide dispersions employed for preparing silver halide emulsions, there can be employed as the dispersing agent for the silver halide in its preparation, gelatin or some other colloidal material such as colloidal albumin, a cellulose derivative, or a synthetic resin, for instance, a polyvinyl compound, although gelatin is preferred. Mixtures can be used (e.g. gelatin and polyacrylamide).

The above-described emulsions of the invention can be coated on a wide variety of supports in accordance with usual practice. Typical supports for photographic elements of the invention include cellulose nitrate film, cellulose acetate film, polyvinyl acetal film, polystyrene film, polyethylene terephthalate film and related films or resinous materials, as well as glass, paper, polyethylene coated paper, metals, wood and others.

Useful bleachable dyes for our process comprise those that are readily reduced to a colorless compound in the presence of metallic image silver and a bleaching bath, e.g., many substantive and acid azo dyes, and certain anthraquinone and triphenylmethane dyes. Examples of such dyes are given in U.S. Patents 2,020,775, issued Nov. 12, 1935, and 2,270,118, issued Jan. 13, 1942. Other operable dyes are illustrated by U.S. Patents 3,038,802, issued June 12, 1962, and 3,156,561, issued Nov. 11, 1964, British Patents 711,233 and 913,860, and French Patent 1,261,090.

The bleachable dyes may be incorporated in the silver halide emulsion layer or in an adjacent hydrophilic colloid layer. Preferably the dyes are non-diffusing. However, dyes of a diffusible nature, e.g., certain acid azo dyes, may be rendered non-wandering by mordanting with agents such as poly(α-methylallyl - N - guanidylketimine glycollate), described in U.S. Patent 2,882,156, issued Apr. 14, 1959.

Image-wise bleaching of the incorporated dyes is carried out generally in a solution comprising a halogen acid, e.g., hydrochloric or hydrobromic acids; a halide salt, e.g., potassium bromide; a silver halide solvent, e.g., thiourea or pyridine; and a catalyst to accelerate the bleaching action, e.g., 2-amino-3-hydroxyphenazine or 2,3-diphenylquinoxaline. Other derivatives of phenazine and quinoxaline as well as certain oxazines and sulfoanthraquinones may be used. The bleach catalysts may be incorporated in the silver halide emulsion layers or they may be contained in the bleach bath.

Typical bleaching compositions for silver-dye-bleach baths as well as other compounds which may be substituted for the various components thereof are described in U.S. Patents 2,020,775 and 2,270,118, referred to above, U.S. Patent 2,183,395, issued Dec. 12, 1939, and U.S. Patent 2,564,238, issued Dec. 14, 1946. The bleaching compositions are illustrated further by U.S. Patent 3,156,561, British Patents 711,247, 879,596, and 949,440, and German Patents 1,145,487 and 1,154,345.

It will be understood that modifications and variations may be made within the scope of the invention as described above and as defined in the following claims.

I claim:
1. A photographic element comprising a support having thereon a light sensitive silver halide emulsion and, in association therewith, a bleachable dye, said emulsion layer having incorporated therein a dye density increasing agent having a formula selected from the group consisting of

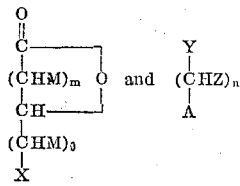

wherein:
(1) M and Z are each selected from the group consisting of a hydroxy radical and an acyloxy radical having the formula

wherein R is selected from the group consisting of an alkyl radical and an aryl radical;
(2) X is selected from the group consisting of a hydrogen atom, a carbinol radical, a radical having the formula

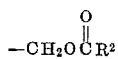

wherein $R^2$ is selected from the group consisting of an alkyl radical and an aryl radical;
(3) Y is selected from the group consisting of a carboxy radical, a carbamyl radical and a radical having the formula

wherein $R^1$ is an alkyl radical;
(4) A is selected from the group consisting of a carbinol radical, a carbamyl radical, a carboxy radical, a radical having the formula

wherein $R^1$ is an alkyl radical and a radical having the formula

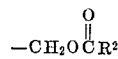

wherein $R^2$ is selected from the group consisting of an alkyl radical and an aryl radical;
(5) $m$ is an integer of 2 to 3;
(6) $n$ is an integer of 1 to 5; and
(7) $o$ is an integer of 0 to 2;
except that at least one of A, Y and Z forms a radical selected from the group consisting of a carbamyl radical and an ester radical.

2. In a photographic element suitable for recording images in color comprising a support having coated thereon at least three separate silver halide emulsion layers, said layers being differentially sensitive to blue, green and red radiation, and said layers having in association therewith, respectively, bleachable yellow, magenta and cyan dyes, the improvement which comprises incorporating in at least one of said emulsion layers an effective concentration of a dye-density increasing compound having a formula selected from the group consisting of

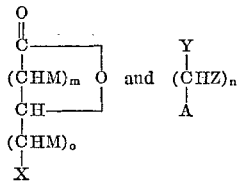

wherein:
(1) M and Z are each selected from the group consisting of a hydroxy radical and an acyloxy radical having the formula

wherein R is selected from the group consisting of alkyl radical and an aryl radical;
(2) X is selected from the group consisting of a hydrogen atom, a carbinol radical, a radical having the formula

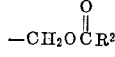

wherein $R^2$ is selected from the group consisting of an alkyl radical and an aryl radical;
(3) Y is selected from the group consisting of a carboxy radical, a carbamyl radical and a radical having the formula

wherein $R^1$ is an alkyl radical;
(4) A is selected from the group consisting of a carbinol radical, a carbamyl radical, a carboxy radical, a radical having the formula

wherein $R^1$ is an alkyl radical and a radical having the formula

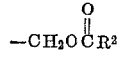

wherein $R^2$ is selected from the group consisting of an alkyl radical and an aryl radical;
(5) $m$ is an integer of 2 to 3;
(6) $n$ is an integer of 1 to 5; and
(7) $o$ is an integer of 0 to 2;
except that at least one of A, Y and Z forms a radical selected from the group consisting of a carbamyl radical and an ester radical.

3. In a photographic element suitable for recording images in color comprising a support having coated thereon at least three separate silver halide emulsion layers, said layers being differentially sensitive to blue, green and red radiation, and said layers having in association therewith, respectively, bleachable yellow, magenta and cyan dyes, the improvement which comprises incorporating in at least one of said emulsion layers an effective concentration of a dye-density increasing compound having the formula

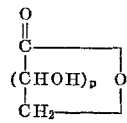

wherein $p$ is an integer of 2 to 3.

4. In a photographic element suitable for recording images in color comprising a support having coated thereon at least three separate silver halide emulsion layers, said layers being differentially sensitive to blue, green and red radiation, and said layers having in association therewith, respectively, bleachable yellow, magenta and cyan dyes, the improvement which comprises incorporating in at least one of said emulsion layers an effective concentration of a dye-density increasing compound having the formula

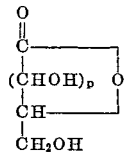

wherein $p$ is an integer of 2 to 3.

5. In a photographic element suitable for recording images in color comprising a support having coated thereon at least three separate silver halide emulsion layers, said layers being differentially sensitive to blue, green and red radiation, and said layers having in association therewith, respectively, bleachable yellow, magenta and cyan dyes, the improvement which comprises incorporating in at least one of said emulsion layers an effective concentration of a dye-density increasing compound having the formula

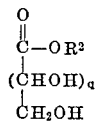

wherein $q$ is an integer of 1 to 5 and $R^2$ is an alkyl radical having 1 to 2 carbon atoms.

6. In a photographic element comprising a support having a red sensitive silver halide emulsion layer thereon, said layer containing a bleachable cyan dye, the improvement which comprises incorporating in said layer from about 10 to 50 grams, per mole of silver in said layer of methyl D-arabonate.

7. In a photographic element comprising a support having a red sensitive silver halide emulsion layer thereon, said layer containing a bleachable cyan dye, the improvement which comprises incorporating in said layer from about 10 to 50 grams, per mole of silver in said layer, of ethyl D-arabonate.

8. In a photographic element comprising a support having a red sensitive silver halide emulsion layer thereon, said layer containing a bleachable cyan dye, the improvement which comprises incorporating in said layer from about 10 to 50 grams, per mole of silver in said layer, of D-arabono-γ-lactone.

9. In a photographic element comprising a support having a red sensitive silver halide emulsion layer thereon, said layer containing a bleachable cyan dye, the improvement which comprises incorporating in said layer from about 10 to 50 grams, per mole of silver in said layer, of D-arabonamide.

References Cited
UNITED STATES PATENTS

| | | | |
|---|---|---|---|
| 2,845,349 | 7/1958 | Schwarz | 96—66 |
| 3,305,363 | 2/1967 | Beavers et al. | 96—66.3 |
| 3,330,661 | 7/1967 | Beavers et al. | 96—66.3 |

NORMAN G. TORCHIN, *Primary Examiner.*

MARY F. KELLEY, *Assistant Examiner.*